United States Patent [19]

Ora

[11] 4,110,154
[45] Aug. 29, 1978

[54] METHOD FOR MAKING A SOLUBLE SULFITE ADDITIVE FOR USE IN A PULP MAKING PROCESS

[75] Inventor: Alpo Ora, Rauma, Finland

[73] Assignee: Rauma-Repola OY, Finland

[21] Appl. No.: 814,021

[22] Filed: Jul. 8, 1977

Related U.S. Application Data

[63] Continuation of Ser. No. 660,232, Feb. 23, 1976, abandoned.

[30] Foreign Application Priority Data

Mar. 20, 1975 [FI]  Finland ................... 750831

[51] Int. Cl.² ............................................. D21C 11/02
[52] U.S. Cl. ............................. 162/36; 210/30 R; 210/38 A; 423/519
[58] Field of Search ............... 162/29, 36; 210/30 R, 210/38 A; 423/519, 157, 181

[56] References Cited

U.S. PATENT DOCUMENTS

| | | | |
|---|---|---|---|
| 1,378,616 | 5/1921 | Richter | 423/519 |
| 1,934,655 | 11/1933 | Bradley et al. | 162/36 |
| 2,042,478 | 6/1936 | Miller et al. | 423/519 |
| 2,392,435 | 1/1946 | Tyler | 210/38 A |
| 2,656,249 | 10/1953 | Gray et al. | 423/519 |
| 2,696,424 | 12/1954 | Schoeffel | 423/519 |
| 2,736,635 | 2/1956 | Haywood | 162/29 |
| 2,778,714 | 1/1957 | Kasper et al. | 162/36 |
| 2,823,120 | 2/1958 | Parrett | 162/36 |
| 3,083,078 | 3/1963 | Manchester et al. | 210/38 A |
| 3,496,093 | 2/1970 | Camp | 210/38 A |
| 3,819,802 | 6/1974 | Robinson | 162/29 |

OTHER PUBLICATIONS

Pulp & Paper, vol. I, Casey, Interscience Publishers, 1952, p. 128.

Primary Examiner—S. Leon Bashore
Assistant Examiner—Peter F. Kratz
Attorney, Agent, or Firm—Burns, Doane, Swecker & Mathis

[57] ABSTRACT

Sodium bisulfite, for use in the acid digestion of wood to produce pulp is obtained for the process by passing calcium bisulfite through a strong cation exchange resin in the sodium form and regenerating the exchanger with sodium chloride. The calcium bisulfite for the process can be obtained in a known manner, for instance, in an acid tower of the sulfite pulp industry or by passing sulfur dioxide through milk of lime. The process avoids environmental pollution caused by the usual discharge into streams of waste calcium salts from the older sulfiting processes and by the release into the atmosphere of sulfur dioxide containing combustion gases.

8 Claims, 1 Drawing Figure

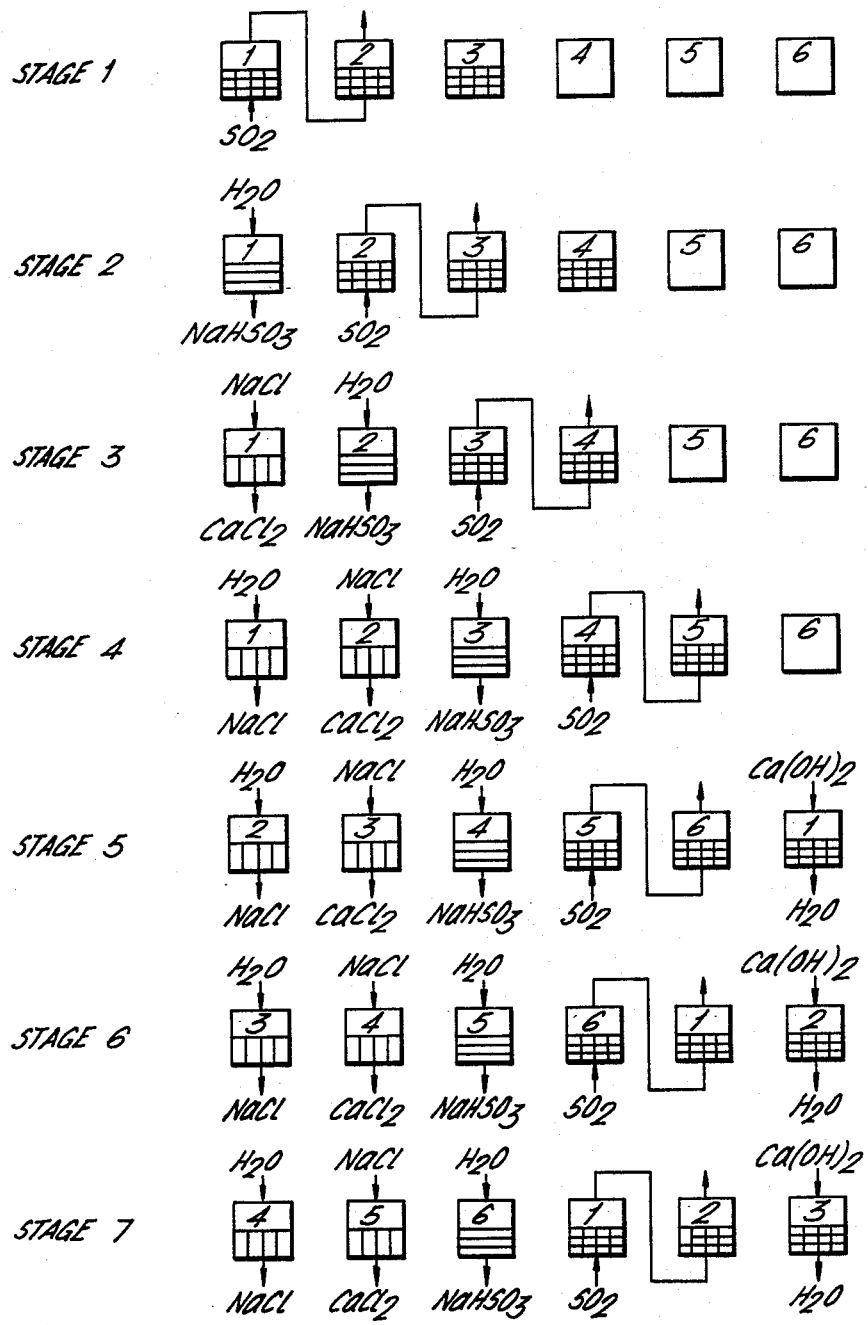

METHOD FOR MAKING A SOLUBLE SULFITE ADDITIVE FOR USE IN A PULP MAKING PROCESS

This is a continuation of application Ser. No. 660,232, filed Feb. 23, 1976 and now abandoned.

The present invention relates to a method for making a chemical to be added to a process of pulp making in which process soluble base is used. More particularly, the invention relates to a process in which Na bisulfite is used as soluble base. The invention is characterized in that the said Na bisulfite solution is made from calcium bisulfite solution by exchanging its calcium for sodium by means of strongly acidic cation exchange resin which has a sulfonic acid group as an exchange center and by using sodium chloride salt solution for regenerating the resin into sodium form.

The base lost in cellulosic pulp cooking and recovering process is replaced by sodium bisulfite obtained from sodium chloride solution and calcium bisulfite solution by means of ion exchange.

In a so called classic pulp sulfite cooking method, calcium hydrosulfite solution containing a varying amount of free $SO_2$, is used as cooking acid. The method, however, has certain disadvantages due to which mills using this method have been, or will in the near future, be compelled to discontinue their operation.

The greatest of these disadvantages is water and air pollution. Considerable difficulties in washing arise when recovering and evaporating spent liquor from calcium sulfite cooking, due to the poor solubility of calcium sulfite.

Because of this, the recovering degree of recovery is not very great and this results in water pollution. The so called secondary condensates of evaporating further add to the water requirement. In the burning of spent liquor, considerable amounts of $SO_2$ gases go into air with flue gas causing air pollution which is very difficult to prevent.

When using soluble bases, such as Na base, the spent liquor can be recovered in washing as carefully as is technically and economically possible. By neutralizing the spent liquor with sodium hydroxide, it is also possible to considerably reduce water pollution caused by so called secondary condensates. In addition, the amounts of $SO_2$ gas passing into the air with the flue gases can be reduced. Because it is also known that by means of processes using soluble bases, pulp can be cooked in a much more adabtable way, making it possible to vary reaction conditions within a wide range, so that the quality of the finished product can be varied as desired, there is a tendency to use soluble bases also in connection with sulfite cooking process.

The so called Rauma process can be mentioned as a good example. This process uses Na base and it has been described in the paper by Ilpo Hassinen and Reino Rasanen in Pulp & Paper Magazine of Canada, Volume 75, No. 1, pages T 13–15, January, 1974, with under the title The flexible Rauma Process — an effective tool against enviromental pollution — and mill using it.

Due to the high cost of sodium salts, the spent liquor is recovered as carefully as possible, concentrated, burnt and regenerated into cooking acid.

In the whole process, depending on the technical level of the recovering system, and on the amount of sodium used in the cooking process, there is naturally, a certain sodium loss which, depending on the recovering system, is usually replaced by sodium carbonate and in some systems by sodium sulfate. In the former case, the chemical is added into the acid making process in which sodium bisulfite is made, and in the latter case into a so called recovery boiler in which the spent liquor is burnt. In burning, Na salts are reduced to Na sulfide which in the recovery station is further converted into Na carbonate and $SO_2$ gas, which are used for making sodium bisulfite in the acid department of the mill.

The amounts of chemical to be replaced are 15–60 kg $Na_2CO_3$/ton of pulp produced.

A method is also known in which sodium bisulfite solutions are made from solutions of sodium salts of weak acids, such as carbonic acid and hydrogen sulfide, by conducting the solutions through a so called weak cation exchanger in hydrogen ion form and containing carboxyl groups and by subsequently treating the resin with sulfur dioxide water so that the sodium combined with the resin is recovered as sodium bisulfite solution and the sodium salt obtained in this way can be used as additive chemical.

Naturally it is reasonable to use the latter method only when dilute aqueous solutions of the sodium salts of the said weak acids are available at a low price, because when the chemicals are dehydrated or in the form of strong solutions they can be used as such in the process.

If an attempt is made to apply the said method with a solution of a sodium salt of a strong acid such as hydrogen chloride, using a weak cation exchanger such as an exchanger marketed by Rohm and Haas under the trade name "Amberlite ICR-50," practically no sodium combines with the resin, due to the weak acid character of the exchanger. If on the other hand, a strong cation exchange resin containing sulfonic acid groups, such as "Dowex 50" marketed by Dow Chemical Co. or "Amberlite IR-120" marketed by Rohm and Haas, is used as the cation exchange resin, practically all of the sodium from the solution combine with the cation exchange resin. Although sodium is recovered as sodium bisulfite solution when the resin is subsequently treated with $SO_2$ water, the solution is so dilute in relation to sodium that its economical use is difficult. Without concentration it cannot be used as an addition chemical in the pulp industry. The diluteness of the solution is caused by the fact that sulfurous acid, as a weak acid, has to be used in great excess when eluating sodium from a very strong acid cation exchanger, for instance "Amberlite IR-120."

So it is to be noted that in the prior art methods, the lost sodium has to be replaced either by some sodium salt of a weak acid such as carbonic acid or hydrogen sulfide, or by sodium sulfate.

The most common, easiest to obtain and consequently least expensive sodium salt is sodium chloride which is used for instance as a raw material for making sodium carbonate in the known Solvay process. However, the use of sodium chloride as a replacement of lost sodium in pulp cooking has not been possible according to present methods, neither when using the known ion exchange method as has been stated above, nor when using NaCl as such, whether for making Na hydrogen sulfide or Na sulfite for the cooking acid, or by adding it to the recovery boiler in the same way as sodium sulfate.

According to the present invention, however, it is possible to replace the lost sodium by sodium obtained from inexpensive sodium chloride. For instance, either mountain salt or sea salt can be used as sodium chloride, depending on which is more economical in each case, or it is possible to use sea water with a sufficient salt content.

According to the invention, it is possible to pass calcium bisulfite solution made in a known way, for instance, in an acid tower of a wood pulping industry, and having a calcium content as great as possible and a so called actually free $SO_2$ content as small as possible, through a strong cation exchanger or exchangers containing sulfonic acid groups and regenerated with sodium salt, for instance through one or several of the following exchangers: "Dowex 50", "Amberlite IR-120" or "Permutit RS" (Permutit Co.). The calcium in the solution is exchanged for the sodium in the resin, and sodium bisulfite solution is obtained. The sodium content of the sodium bisulfite solution corresponds to the calcium content of the calcium bisulfite solution conducted into the cation exchange column, and so the solution has a Na content which makes it suitable for use in pulp industry as an addition chemical. Also other known methods can be used for making calcium bisulfite solution which is free from organic substance.

Calcium bisulfite solution can, for instance, also be made by conducting $SO_2$ into milk of lime. The sodium bisulfite solution obtained, which is practically free from calcium, can be used for making solutions with any particular desired sodium and $SO_2$ content in a way suitable for each purpose, for instance by diluting with water, by increasing the $SO_2$ content, or by neutralizing with sodium carbonate or sodium hydroxide, etc.

When the resin is saturated with calcium, it is regenerated by sodium chloride solution or sea water the sea water preferably having a salt content of 3-4 percent.

In case a purest possible calcium free solution is required in some process, it is obtained from the above made solution by neutralizing with caustic soda or soda so that pH is $\geq$ 5.5. Calcium bisulfite is precipitated as calcium sulfite and can be removed from the solution in known ways, for instance by filtering.

One embodiment of the invention is described below with reference to the accompanying drawing. In the drawing, ion exchange resins are in reaction vessels 1-6, through which liquids and gases can be conducted into an adjacent vessel by means of conduits and devices not shown in the drawing. Stages 1-7 are successive stages of the same reaction series, in this order. The occurances shown in adjacent reaction vessels 1-6 are simultaneous.

The horizontal lines in the lower part of a reaction vessel indicates an exchanger charged with calcium, that is the ion exchange resin in the vessel in question is charged with Ca. Correspondingly, vertical lines indicate that the resin in question is charged with Na. Crosswise lines indicate that the vessels in question contain strong cation exchange resin, charged with Na, and lime or $Ca(OH)_2$ suspension, or calcium carbonate or $CaCO_3$ suspension. The amount of calcium in the suspension is so great that is corresponds to the amount of sodium in the resin.

The following procedure takes place at stages 1-7 of the drawings:

Stage 1

$SO_2$ gas is conducted into vessel 1 through a suitable nozzle. In the usual way, $SO_2$ reacts with $CaCO_3$ or $Ca(OH)_2$, and $Ca(HSO_3)_2$ is formed. Unreacted $SO_2$ or residual gas, and $CO_2$ formed from $CaCO_3$ are conducted into vessel 2, and possibly still unreacted $SO_2$ and other gases in vessel 2 are conducted further into vessel 3, and into still further vessels depending on how small residual $SO_2$ contents are desired. In practice, two-three vessels are quite sufficient.

Instead of $SO_2$ gas only, it is also possible to conduct flue gas containing $SO_2$.

The $Ca(HSO_3)_2$ formed immediately exchanges its Ca ion for the Na ion of the ion exchange resin, and as a result $NaHSO_3$ is formed. By analyzing the solution of vessel 1, it is possible to observe when the reaction, in which calcium reacts with $SO_2$ gas and at the same time is dissolved and then is exchanged for Na ion, is finished.

Stage 2

The feeding of $SO_2$ gas of flue gas through vessel 1, described in stage 1, being finished, the solution in vessel 1 is displaced by clean water, that is, by causing clean water to flow into the vessel so that the $NaHSO_3$ formed is removed. The arrows at this point, as well as elsewhere in the drawing, indicate the directions of flow of materials, in liquid solution or gas form into the vessel or away from it.

Depending on the intended use, the sodium bisulfite solution obtained, which contains some calcium bisulfite as impurity, can be used either as such, or the residual calcium can be removed by conducting the solution through a filter in the same or a separate system and regenerated by sodium salt, or the calcium can be precipitated by neutralizing with NaOH solution or sodium carbonate solution, at a pH $\geq 5.5$.

The precipitated calcium can then be removed from the solution in a known way, for instance by filtering. $SO_2$ gas is conducted simultaneously through vessels 2 and 3, or the residual $SO_2$ from vessel 2 into vessel 3 as shown by the arrow, and from vessel 3 the residual $SO_2$ is removed from the top in the direction of the arrow. The $Ca(HSO_3)_2$ formed in vessels 2 and 3 is converted into $NaHSO_3$ as described above.

Stage 3

When the reaction described in stage 2 to produce $NaHSO_3$ is finished in vessel 2, the $NaHSO_3$ in it is displaced by water and the sodium bisulfite solution obtained can be treated as above. The ion exchange resin in vessel 1 is regenerated by NaCl solution, and $SO_2$ gas is led through vessels 3 and 4.

Stage 4

Vessel 1 is rinsed with water so that excess NaCl solution is removed. The ion exchange resin in vessel 2 is regenerated with NaCl solution. Sodium bisulfite solution is obtained from vessel 3 by displacing with water. $SO_2$ gas is led through vessels 4 and 5.

At the following stages 5-7, the procedure is further as described above shown by the drawing. The process is circulating in adjacent vessels as in a circle from the beginning to the end and from the end again to the beginning. At stage 7, the situation in vessels 1 and 2 is again the same as at stage 1. At stage 7, vessel 3 is charged with $Ca(OH)_2$ suspension as shown by arrows. This is an operation which was not shown in stage 1 at vessel 3 for purposes of clarity.

The number of reaction vessels depends on the times required for each partial operation, conducting of $SO_2$, displacement, rinsing, regeneration, etc. It is to be noted that the regeneration of the resin, the rinsing, the adding of lime suspension and the displacing of the sodium bisulfite solution formed take relatively little time, compared to the conducting of $SO_2$ gas and its reaction, so that they or most of them can be carried out at one stage, simultaneously with the conducting of $SO_2$.

For instance, if stages 2, 3 and 4, where at stage 2 water displacement takes place in vessel 1, at stage 3 NaCl revival and at stage 4 water rinsing, are considered, these stages are so fast that in practice they all can be carried out at stage 2. In the drawing, they have been shown as taking place at different stages for purpose of clarity only.

The concentration of the obtained bisulfite solution can be adjusted by changing the amount of water in the reaction vessel.

If at stage 1 there is excess calcium in the resin in relation to the sodium $SO_2$ gas is conducted until the amount of calcium bisulfite formed in the reaction is changed into sodium in the resin, after which the displaced solution at stage 1 is filtered, and the filtrate is used as such, or either $SO_2$ or Na, for instance as $Na_2CO_3$, can be added to it, depending on whether the product is desired to contain $SO_2$ or Na in excess. The filtered precipitate is reused as clacium suspension according to FIG. 1 at some suitable stage.

Of course it is possible to carry out the reaction time so that there is originally less calcium than sodium in the resin, in this case sodium remains in the resin after the ion exchange.

Table I, below shows addition chemicals used in known methods, their unit prices on Oct. 4, 1974, and correspondingly price per ton of pulp produced. The amount of addition chemical has been taken as 15-60 kg of $Na_2CO_3$/ton of pulp which corresponds to a sodium amount of 6.5-26 kg of Na/ton of pulp.

The lower part of Table I shows chemicals used in the process according to the present invention. In the example, 2 equivalents of sodium chloride per one equivalent of exchanged Ca have been used for regeneration. This has been taken into account in column "Finnish marks/ton of pulp."

Table I

| Addition | Price | | |
|---|---|---|---|
| | Finnish Marks/ ton of stated chemical | Finnish Marks/ ton of Na | Finnish Marks/ ton of pulp |
| In a known way | | | |
| $Na_2CO_3$ | 1250 | 2880 | 19 – 75 |
| $Na_2SO_4 \cdot 10 H_2O$ | 210 | 1470 | 10 – 38 |
| According to the invention | | | |
| NaCl | 62 | 157 | 2 – 8 |
| $CaCO_3$ | 38 | 83 | 1 – 4 |
| | | Total | 3 – 12 |

The price of addition chemical per unit of product according to the invention is only one third of the price of the known process, using the cheapest chemical, sodium sulfate.

The use of sodium sulfate has its disadvantages in the chemical regeneration. Apparently, it also increases the sulfur dioxide content of the flue gases of the recovery boiler, consequently also increasing air pollution.

With good reason, the chemical costs according to the invention should be compared to the price of sodium carbonate, and then the price of the product according to the invention is only about 16% of the price of the product made of $Na_2CO_3$.

Some typical results obtained in laboratory tests are set forth in the following example.

In these tests, a strong cation exchanger "Permutit RS" containing sulfonic acid groups was used as the ion exchange resin. A vertical tube, made of acrylic plastic, and having a height of 50 cm and an inner diameter of about 2.9 cm was used as an ion exchange tube which contained cation exchanger and through which the solutions were conducted. The height of the resin column in the tube was 45 cm when saturated with sodium. The amount of resin was 297 $cm^3$.

The composition of the $Ca(HSO_3)_2$ solution used in the run was:

| Calcium, Ca | 13.1 g/l |
|---|---|
| Total $SO_2$ | 59.0 " |

225 ml of the solution was used in each test.

Regeneration was carried out with 10% NaCl solution. The filtering rate or the flow rate of $Ca(HSO_3)_2$ solution through the tube was about 10 m/h, and the regeneration rate or flow rate of NaCl solution through the tube was about 2 m/h. The regenerating and the actual run or the flow of $Ca(HSO_3)_2$ took place countercurrent so that the laboratory column was always turned 180° after the run and the regenerating.

In each test, 225 ml of Ca hydrogen sulfite solution, containing 13.1 g of Ca/l, was used. When the amount of resin was 297 $cm^3$, it can be calculated that the exchange level of resin was 0.5 equiv. of Ca/l of resin. The regeneration level or the amount of sodium used for regeneration per exchanged calcium varied between 3.5-1.6 equiv. of NaCl per one Ca equivalent exchanged.

So many runs at each regeneration level were carried out that an equilibrium corresponding to each level was formed in the resin. The analysis values corresponding to the equilibrium have been used in Table II set forth below. The calcium bisulfite solution was first run through the column with a rate of 10 m/h, and then the $NaHSO_3$ solution remaining in the column was displaced by distilled water at the same rate. Samples were collected in quantities of 10 ml, and Na and Ca were analyzed.

Table II shows typical results for regeneration levels of 3.5, 2.0 and 1.6 equiv. of NaCl/l equiv. of Ca exchanged.

Table II

| | 3.5 | | 2.0 | | 1.6 | |
|---|---|---|---|---|---|---|
| Sample 100 ml | $Na_2O$ g/l | Ca mg/l | $Na_2O$ g/l | Ca mg/l | $Na_2O$ g/l | Ca mg/l |
| 1 | 0.00 | 0.0 | 0.00 | 0.0 | 0.00 | 0.0 |
| 2 | 9.49 | 3.2 | 8.31 | 5.8 | 6.73 | 10.8 |
| 3 | 20.86 | 19.0 | 20.80 | 39.9 | 18.18 | 84.4 |
| 4 | 20.86 | 35.9 | 20.80 | 119.3 | 18.18 | 183.6 |
| 5 | 6.94 | 4.4 | 6.73 | 9.9 | 6.12 | 18.5 |
| 6 | 0.96 | 0.1 | 1.01 | 0.3 | 0.96 | 0.5 |
| aver. 2-5 | 14.54 | 15.8 | 14.18 | 43.7 | 12.30 | 74.3 |

It can be seen that the sodium bisulfite solution obtained is practically calcium free. At the regeneration level of 3.5, the hardness of bisulfite solution has been 2.2°dH, on an average, (corresponding to 15.8 mg of Ca/l), at the regeneration level of 2.0, 6.1°dH (43.9 mg of Ca/l), and at the revival level of 1.6, 10.4°dH (74.3 mg of Ca/l).

It is obvious that on an industrial scale, the process has to be planned so that both the chemical loss and the dilution of the finished sodium bisulfite solution will be as small as possible. This can be achieved for instance by using some of the following methods with trade names: "Asahi," "Higgins," "Servo-kontimat," "Fluicon" or modifications and/or combinations thereof.

I claim:

1. In a process for manufacturing pulp by the sodium base sulfite digestion of wood wherein waste liquor from the digestion stage is evaporated, burned, and recovered as sodium carbonate and sodium sulfide, in which process there occur losses of sodium, the improvement which comprises making up said losses of sodium by:
   (a) passing a solution of calcium bisulfite free from organic substance through a strongly acidic cation exchange resin in the sodium form having sulfonic acid groups as the exchange centers to obtain a sodium bisulfite effluent;
   (b) adding said obtained sodium bisulite effluent as makeup to the digestion stage of the pulp manufacturing process;
   (c) regenerating said cation exchange resin by passing therethrough a solution of sodium chloride;
   (d) washing the resin with water; and
   (e) cyclically repeating steps (a), (b), (c), and (d).

2. The method of claim 1 wherein the regenerating solution comprises sea water having a salt content of 3–4%.

3. The method of claim 1 wherein the calcium bisulfite solution comprises a solution obtained from the acid tower of a wood pulping process, said solution having a high calcium content and a low free sulfur dioxide content.

4. The process of claim 1 wherein calcium sulfite remaining as a residual impurity in said sodium bisulfite effluent is removed by neutralizing said effluent with sodium hydroxide or sodium carbonate to a pH of at least 5.5 to precipitate said residual calcium sulfite.

5. In a process for manufacturing pulp by the sodium bisulfite digestion of wood wherein waste liquor from the digestion stage is evaporated, burned, and recovered as sodium carbonate and sodium sulfide, in which process there occur losses of sodium, the improvement which comprises making up said losses of sodium by:
   (a) completely reacting sulfur dioxide gas with calcium carbonate or calcium hydroxide in a reaction vessel containing water and a strongly acidic cation exchange resin in the sodium form to exchange the calcium for the sodium in the resin and to produce a reaction mixture comprising a water solution of sodium bisulfite and the calcium form of said cation exchange resin;
   (b) separating the water solution of sodium bisulfite from the calcium form of the cation exchange resin;
   (c) recovering said water solution of sodium bisulfite for use as makeup in the pulp digesting process;
   (d) regenerating the cation exchange resin with a solution of sodium chloride;
   (e) adding calcium carbonate or calcium hydroxide to the reaction vessel; and
   (f) cyclically repeating steps (a) through (e).

6. The process of claim 4 wherein the precipitated calcium sulfite is recovered and reacted with calcium carbonate or calcium hydroxide to produce calcium bisulfite.

7. The process of claim 5 wherein the sulfur dioxide is contained in flue gases from the burning and recovery of waste liquor.

8. In a process for manufacturing pulp by the sodium bisulfite digestion of wood wherein waste liquor from the digestion stage is evaporated, burned, and recovered as sodium carbonate and sodium sulfide, in which process there occur losses of sodium, the improvement which comprises making up said losses of sodium by:
   (a) providing at least three reaction vessels, each containing a strongly acidic cation exchange resin in the sodium form and an aqueous suspension of calcium carbonate or calcium hydroxide;
   (b) passing sufficient sulfur dioxide-containing gas in a first stage of said process through a first of said reaction vessels until all of the calcium carbonate or calcium hydroxide contained therein has been converted to calcium bisulfite and said calcium bisulfite has reacted with the cation exchange resin to form sodium bisulfite and the calcium form of the cation exchange resin, while simultaneously passing unreacted sulfur dioxide-containing gas through a second of said reaction vessels;
   (c) continuing to pass sulfur dioxide-containing gas in a second stage of said process through the second of said reaction vessels, until all of the calcium carbonate or calcium hydroxide contained therein has been converted to calcium bisulfite and said calcium bisulfite has reacted with the cation exchange resin to form sodium bisulfite and the calcium form of the cation exchange resin, simultaneously passing unreacted sulfur dioxide gas from said second reaction vessel through a third of said reaction vessels, and simultaneously passing water through the first reaction vessel to remove and recover sodium bisulfite solution;
   (d) passing sodium chloride solution in a third stage of said process through the first reaction vessel to regenerate the cation exchange resin and convert said resin to the sodium form, simultaneously passing water through the second reaction vessel to remove and recover sodium bisulfite solution, and simultaneously continuing to pass sulfur dioxide-containing gas through the third reaction vessel until all of the calcium carbonate or calcium hydroxide contained therein has been converted to calcium bisulfite and said calcium bisulfite has reacted with the cation exchange resin to form sodium bisulfite and the calcium form of the cation exchange resin;
   (e) passing water in a fourth stage of said process through the first reaction vessel to remove excess sodium chloride, simultaneously passing sodium chloride solution through the second reaction vessel to regenerate the cation exchange resin to the sodium form, and simultaneously passing water through the third reaction vessel to remove and recover sodium bisulfite solution;
   (f) adding calcium carbonate or calcium hydroxide to the first reaction vessel in a fifth stage of said process, simultaneously passing water through the second reaction vessel to remove excess sodium chloride, and simultaneously passing sodium chloride solution through the third reaction vessel to regenerate the cation exchange resin and convert said resin to the sodium form;
   (g) passing sulfur dioxide-containing gas through the first reaction vessel in a sixth stage of said process, simultaneously adding calcium carbonate or calcium hydroxide to the second reaction vessel, and simultaneously passing water through the third reaction vessel to remove excess sodium chloride;

(h) continuing to pass sulfur dioxide-containing gas through the first reaction vessel in a seventh stage of said process, simultaneously passing unreacted sulfur dioxide-containing gas from said first reaction vessel to the said reaction vessel, and simultaneously adding calcium carbonate or calcium hydroxide to the third reaction vessel; and (i) cyclically repeating stages 1 through 7 to produce and recover sodium bisulfite solution to make up losses of sodium in said pulp manufacturing process.

* * * * *